Patented Aug. 10, 1926.

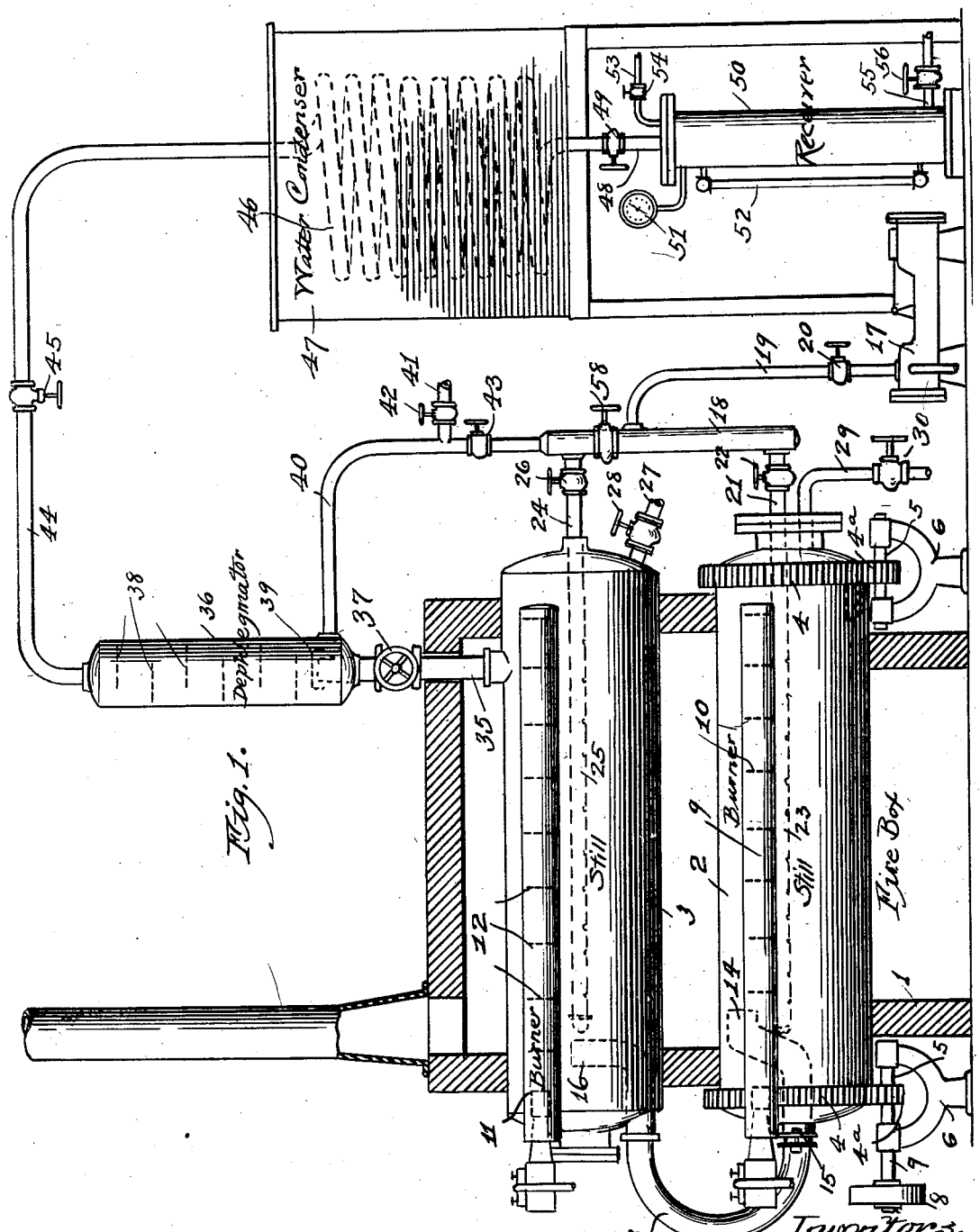

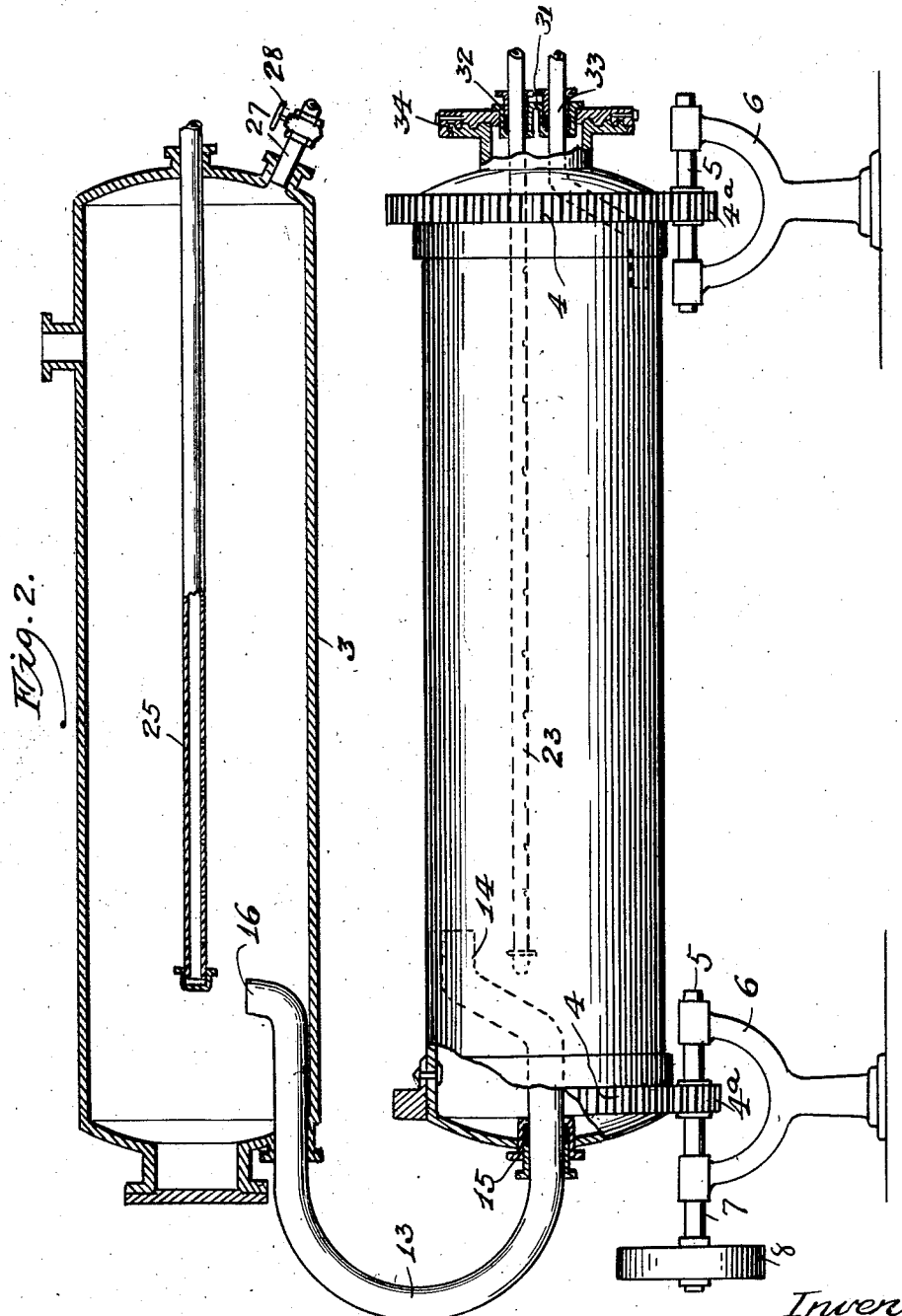

1,595,179

UNITED STATES PATENT OFFICE.

GUSTAV EGLOFF AND HARRY P. BENNER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA.

APPARATUS FOR TREATING OIL.

Application filed August 20, 1920, Serial No. 404,900. Renewed January 14, 1926.

This invention relates to improvements in an apparatus for treating oil and refers more particularly to an apparatus for cracking petroleum oil such as emulsified California or Mexican oils.

In the drawings, Fig. 1 is a view partly in side elevation and partly in vertical section of our improved apparatus.

Fig. 2 is a similar view on an enlarged scale, of the still.

Referring to the drawings, 1 designates the fire box in the lower part of which is mounted a rotary still of the shell type, 2, supported on suitable trunnions (not shown). At either end, this shell 2 is provided with a circumferentially extending gear 4, meshing with pinions 4ª, carried by shaft 5, mounted in standard 6. One end of shaft 5 is provided with an extension 7, carrying a driving pulley 8, connected to any suitable source of driving power.

Mounted above the shell 2 is a second shell 3 which is stationary. The upper part of the lower shell 2 is heated by means of a pair of burners 9, slotted as shown at 10 at their inner face and extending longitudinally along opposite sides of the shell 2. Similarly, the upper shell member 3 is heated by similar burners 11, slotted as shown at 12 at their inner faces and likewise extending alongside of the upper part of the still. The arrangement is such that the temperature of the shell 2 can be regulated independently of the temperature in shell 3. The two still members are connected by the transfer line 13, the lower end of which extends as shown at 14 into the rotary still member 2 through a suitable stuffing box 15, the arrangement being such that pipe 13 is stationary while the shell 2 rotates. The upper end of the pipe 13 projects into the shell 3 as shown at 16. The liquid charging stock is supplied by the feed pump 17 from any suitable source of supply to a header 18, through pipe 19, controlled by throttle valve 20. The lower part of the header 18 is connected by inlet pipe 21, controlled by valve 22, to a perforated delivery pipe 23 extending longitudinally through the lower shell member 2. The upper part of the header 18 is connected by line 24 having perforated extension 25 extending through the upper shell member 3, the pipe 24 to be controlled by throttle valve 26. The upper shell member is provided with a liquid draw off 27, controlled by throttle valve 28, and the lower shell member is provided with a liquid draw off line 29, controlled by throttle valve 30. The line 29 may be connected to a suction pump (not shown), if desired.

The pipes 29 and 23 which project into the rotary still member are stationary, passing through the stuffing boxes 31 and 32 respectively. The still is connected to the stationary stuffing boxes through the ground joint 34, the arrangement being such that the still rotates while the stuffing boxes are stationary.

Vapors pass out of the upper part of the shell 3 through vapor line 35 which extends into the lower part of dephlegmator 36. The valve 37 may be interposed in the line 35. The dephlegmator 36 is provided with baffles 38, and a space cap member 39 is mounted above the top of the pipe 35 so as to prevent the reflux condensate from flowing back into the pipe 35. The reflux condensate is drawn off of the bottom of the dephlegmator through pipe 40 which leads to the upper part of the header 18. The pipe 40 is provided with a by-pass line 41 leading to any suitable receptacle, and controlled by throttle valve 42. Below the connection 41 a throttle valve 43 is interposed in pipe 40.

Vapors pass out of the top of the dephlegmator through pipe 44, controlled by throttle valve 45, and leading to condenser coil 46 seated in condenser box 47. The lower part of the coil 46 is connected by pipe 48, controlled by throttle valve 49, to the upper part of a receiver 50. This receiver 50 is provided with pressure gauge 51, liquid level gauge 52, gas outlet 53 controlled by valve 54, and liquid draw off pipe 55 controlled by valve 56.

The apparatus may be operated in various ways. The lower shell member may be continuously or intermittently rotated at a predetermined speed. The fresh charging stock may be delivered to either shell member or to both. The reflux condensate may be returned to either shell member or may be diverted elsewhere and not returned to the system. By inserting a throttle valve 58 in the header 18, as shown, the reflux condensate may be returned to the upper shell 3 and a fresh charging stock delivered to the lower shell 2. The lower shell may be heated at a higher or lower temperature than the upper and the temperature varied at any given part of the time in processs. Differential pressure may be maintained on various parts of the apparatus by suitably regulating the valve shown. In short the apparatus permits of a wide variation in processes.

We claim as our invention:

1. In an apparatus for treating oil, a combination with a rotary still member, of a stationary still member, and transfer line connecting said still members, means for independently heating the upper part of each still member, means for taking off vapors from one of said still members, and means for maintaining a pressure on said still members.

2. In an apparatus for treating oil, the combination with superimposed still members adapted to each receive bulk supplies of oil, means for heating each still member, an oil transfer line from one still member to the other, means for rotating one of said still members without disturbing the other, means for discharging vapors after passage through both of said still members, a dephlegmator, means for passing vapors to said dephlegmator, and means for returning reflux from the dephlegmator to either of said still members.

3. In an apparatus for treating oil, the combination with a pair of still members adapted to receive bulk supplies of oil with a vapor space above the oil level in each still member, a communication between said still members for hydrocarbon substances, means for independently heating each still member by applying heat to the upper portions thereof adjacent the oil level, means for agitating the oil in one of said still members, a vapor discharge from the other still member, a dephlegmator in communication therewith, and means for returning reflux condensate to either still member.

GUSTAV EGLOFF.
HARRY P. BENNER.